Jan. 6, 1942.    R. S. BIGELOW    2,268,638
SHAKER CONVEYER
Filed Dec. 2, 1939
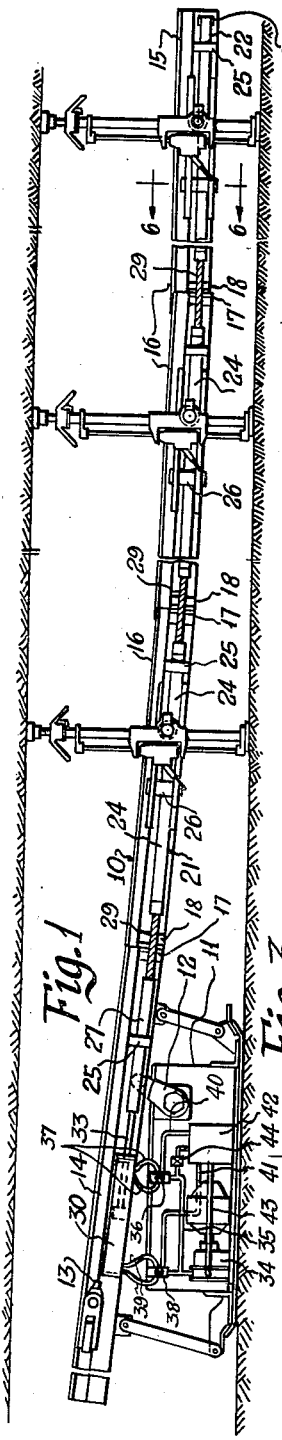
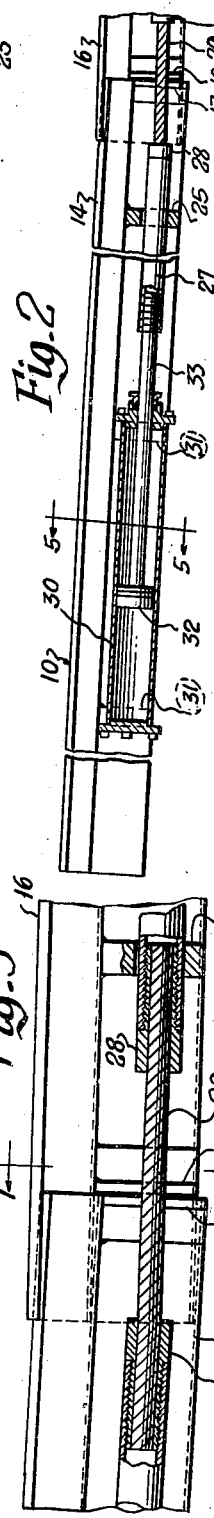
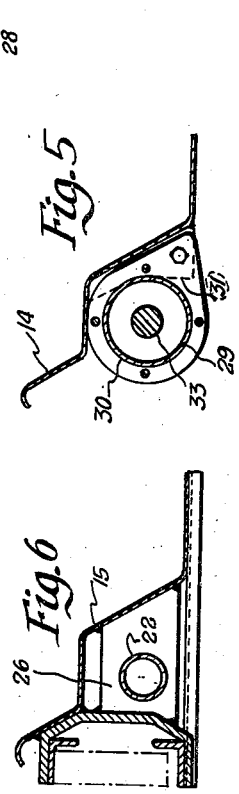
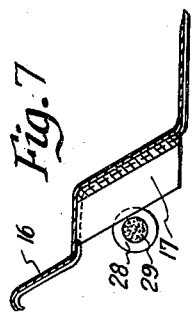
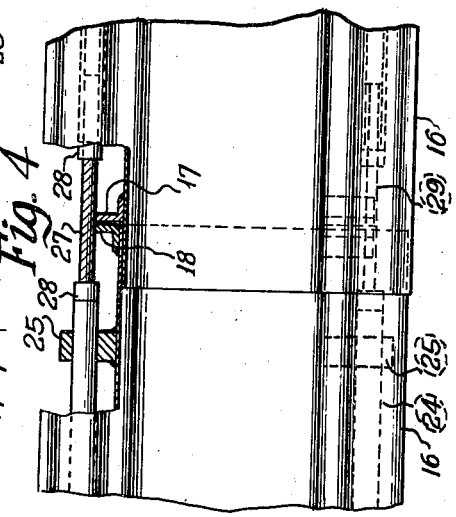
INVENTOR
Roy S. Bigelow
BY Clarence F. Poole
ATTORNEY Patented Jan. 6, 1942

2,268,638

UNITED STATES PATENT OFFICE 2,268,638

SHAKER CONVEYER

Roy S. Bigelow, Chicago, Ill., assignor to Goodman Manufacturing Company, Chicago, Ill., a corporation of Illinois Application December 2, 1939, Serial No. 307,190

10 Claims. (Cl. 198—220)

This invention relates to improvements in shaker conveyers, and more particularly to a flexible coupling device for coupling the troughs of a shaker conveyer trough line together.

The present forms of connecting bolts for connecting the troughs of a shaker conveyer trough line together frequently stretch or break or bend, even when the trough line is not overloaded, and if the bolts are oversize so as to withstand breakage or stretching, the troughs of the trough line will frequently buckle upon overload. This is partially due to the rigid connection between the adjacent troughs of the trough line, made necessary by the use of bolts for connecting the troughs together, and rapid fatigue of the metal, due to unevenness in the trough line, which causes twisting or bending of the troughs or bolts at the points of connection of the troughs together. It has been attempted to remedy this difficulty by devising various forms of connections utilizing wedges or other devices, but these forms of connections are relatively rigid, and while they will withstand breaking or bending, the trough line itself is apt to fail.

The principal objects of my invention are to remedy these difficulties by providing a novel and simple form of flexible connecting means held under tension, for connecting the troughs of a shaker conveyer trough line together, which will permit a certain amount of weaving movement of the troughs with respect to each other in a vertical direction.

Another object of my invention is to provide a novel and simple form of flexible trough connecting means including a pair of flexible connecting members extending along opposite sides of the conveyer from one end thereof to the other, together with a means for holding said connecting members under a predetermined tension during reciprocation of the conveyer.

A more specific object of my invention is to provide a flexible connecting means fixedly connected to one end or the other of the trough line and having fluid pressure means connected to the free end thereof, to hold said connecting means under tension during reciprocation of the conveyor, together with an arrangement to limit the tensile load on said connecting means and prevent overload of the trough line.

Other objects of my invention will appear from time to time as the following specification proceeds, and with reference to the accompanying drawing wherein:

Figure 1 is a view in side elevation of a shaker conveyer trough line having a connecting device constructed in accordance with my invention embodied therein, with certain parts of the fluid pressure system shown diagrammatically;

Figure 2 is an enlarged fragmentary view in side elevation showing the outby or driving trough of the trough line, with certain parts thereof broken away and certain other parts shown in substantially longitudinal section, in order to more clearly illustrate certain details of my invention;

Figure 3 is an enlarged fragmentary view in side elevation of adjoining ends of two intermediate troughs of the trough line, with certain parts broken away and certain other parts shown in substantially longitudinal section;

Figure 4 is a fragmentary plan view of adjoining ends of two intermediate troughs of a trough line, drawn to substantially the same scale as Figure 3 and with certain parts broken away and certain other parts shown in horizontal section;

Figure 5 is a fragmentary transverse sectional view taken substantially along line 5—5 of Figure 2;

Figure 6 is a fragmentary transverse sectional view taken substantially along line 6—6 of Figure 1;

Figure 7 is a fragmentary transverse sectional view taken substantially along line 7—7 of Figure 3.

In the drawing, the embodiment of my invention illustrated is herein shown as being incorporated in a shaker conveyer trough line generally indicated by reference character 10. Said trough line is driven from a reciprocating conveyer drive mechanism generally indicated by reference character 11, through laterally spaced rocking arms 12, 12 and connecting members or pusher rods 13, 13, having pivotal connection with opposite sides of a rear driving trough section 14 of the conveyer (see Figure 1). Said drive mechanism and the drive connection therefrom to the driving trough section 14 are of well known constructions and are no part of my present invention, so are not herein shown or described in detail.

The trough line 10 consists of the driving trough section 14, an inby driven trough section 15, and a plurality of intermediate connecting trough sections 16, 16, herein shown as having their adjacent ends arranged in overlapping or nested relation with respect to each other. Laterally projecting abutting members 17, 17 and 18, 18 project from adjacent ends of said trough sections. The abutting members 17, 17 are herein shown as projecting laterally from opposite sides of one end of one trough section 16, and the abutting members 18, 18 are shown as being spaced a short distance behind the overlapping end of the same trough section. Thus, when the trough sections are connected together, the abutting members 18, 18 on the overlapping end of one trough section will abut the abutting members 17, 17 on the overlapped end of the next adjacent trough section. Said members are adapted to be held in abutting relation with respect to each other during reciprocation of the conveyer by flexible connecting members 21, 21 extending along opposite sides of said trough sections.

Referring now in detail to the flexible connecting members 21, 21, each of said connecting members, as herein shown, includes a coupling rod 22. Said rod is herein shown as being a pipe or seamless tube and is secured at one of its ends to the inby end trough section 15 by means of a clamping member 23, in a suitable manner. Each of said connecting members also includes a plurality of longitudinally spaced coupling rods 24, 24 guided along the sides of the trough sections 16, 16 in laterally projecting brackets 25 and 26, and an end coupling rod 27 guided along the side of the driving trough section 14 in a bracket 25. The coupling rod 22 is connected to the next adjacent coupling rod 24, and the rods 24, 24 are flexibly connected together and to the outby end coupling rod 27, at the junctions between the trough sections, in a similar manner, so the connecting means for one set of said coupling rods only will herein be shown and described in detail.

The coupling rods 24, 24 are herein shown as being internally threaded for a portion of their length and are adapted to have coupling members 28, 28 threaded therein. Said coupling members are mounted on and secured to opposite ends of a flexible cable 29. The coupling rod 27 is flexibly connected to the extreme rear coupling rod 24 by a similar cable 29, and the extreme forward coupling rod 24 is connected to the coupling rod 22 by a similar cable 29. Said coupling rods and cables thus form a single detachable flexible connecting member extending the length of the conveyer, for connecting and holding the abutting members 17, 17 and 18, 18 in abutting relation with respect to each other. Furthermore, since the flexible portions of said connecting members are at the junction between the trough sections, said trough sections may flex with respect to each other in a vertical direction without causing bending of the trough sections proper.

The flexible members 21, 21 are held under tension by means of cylinders 30, 30 mounted on opposite sides of the trough section 14, beneath and inwardly of the flanged portion thereof, on spaced brackets 31, 31 (see Figures 1, 2 and 5). Pistons 32, 32 are reciprocably mounted in said cylinders, and each of said pistons has a piston rod 33 projecting from one end thereof. Said piston rods are suitably secured at their forward ends to the end coupling rods 27, 27.

Fluid under pressure may be admitted to the piston rod ends of the cylinders 30, 30, to move the pistons 32, 32 in a direction to hold the flexible members 21, 21 under tension during reciprocation of the conveyer, and thus hold the troughs 14, 16, 16, and 15 in coupled relation with respect to each other, and fluid under pressure is admitted to the head ends of said cylinders, to relieve tension on said flexible members and permit disassembly of the conveyer.

The fluid pressure system is diagrammatically shown in Figure 1 and includes a pump 34, provided to effect pressure in the system. Said pump may be of any well known construction and is not herein shown or described in detail, since it is no part of my present invention. A conduit 35 leads from said pump to a two-way valve 36, which is provided to admit fluid under pressure to or exhaust fluid from the piston rod ends of the cylinders 30, 30. Flexible conduits 37, 37 lead from said valve to the piston rod ends of said cylinders.

In a like manner, the head ends of the cylinders 30, 30 are connected with the pump 34 by means of a two-way valve 38, which is provided to admit fluid under pressure to or exhaust fluid from the head ends of said cylinders. Flexible conduits 39, 39 lead from said valve to said cylinders. Return conduits 40 and 41 lead from the two-way valves 36 and 38 respectively, to a storage tank 42, and a conduit 43 leads from said tank to the intake side of said pump.

A by-pass valve 44 is provided to by-pass fluid from the valve 36 to the tank 42 upon a predetermined pressure in the piston rod ends of the cylinders 30, 30, and thus maintain a constant pressure in the piston rod ends of said cylinders. Said by-pass valve may be of any ordinary construction and may be adjusted in accordance with the intensity of the drive action of the conveyer, to by-pass fluid at various desired pressures, and thus serves as a safety valve, to prevent buckling of the trough line.

The admission of fluid to the head ends of said cylinders will relieve tension on the flexible connecting member 21 and permit disconnection of any of said trough sections, by unscrewing the desired flexible cables 29, 29 from the sockets in the adjacent ends of the rods 24, 24.

It may be seen from the foregoing that when it is desired to connect the trough line together, the flexible cables 29, 29 are connected to the ends of the rods 24, 24, guided along the sides of the trough sections 16, 16, and the end rods 22, 22 are secured to the in-by conveyer trough section 15. Fluid under pressure may then be admitted to the piston rod ends of the cylinders 30, 30 and maintained in said cylinders at a predetermined safe pressure, during reciprocation of the conveyer, to maintain the flexible connecting members 21, 21 under tension and hold the members 17 and 18 in abutting relation with respect to each other, for connecting the trough sections of the conveyer together during reciprocation of the conveyer.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a plurality of aligned trough sections, and means for connecting said trough sections for reciprocable movement together including a flexible connecting member extending from one end of the conveyer to the other and an extensible and retractible member on an end trough section having connection with said flexible connecting member for maintaining said connecting member under tension during reciprocation of the conveyer, said flexible connecting member including a plurality of spaced apart coupling rods guided along one side of said trough sections, and flexible members connecting said coupling rods together.

2. In a shaker conveyer, a plurality of aligned trough sections, and means for connecting said trough sections for reciprocable movement together including a flexible connecting member extending from one end of the conveyer to the other and fluid pressure means for maintaining said connecting member under tension during reciprocation of the conveyer.

3. In a shaker conveyer, a plurality of trough sections, and means for connecting said trough sections for reciprocable movement together including a flexible connecting member extending from one end of the conveyer to the other and fixedly connected thereto at one of its ends, and means for maintaining said connecting member under tension during reciprocation of the conveyer including a fluid pressure cylinder and piston having connection with the opposite end of said connecting member.

4. In a shaker conveyer, a plurality of trough sections, and means for connecting said trough sections for reciprocable movement together including a flexible detachable sectional connecting member extending along each side of said trough sections from one end of the conveyer to the other and an extensible and retractible member on each side of an end trough section and having connection with said connecting member for maintaining said connecting members under tension, to hold said trough sections in engagement with each other during reciprocation of the conveyer, said flexible connecting member including a plurality of spaced apart coupling rods guided along one side of said trough sections, and flexible members connecting said coupling rods together.

5. In a shaker conveyer, a plurality of trough sections, and means for connecting said trough sections for movement together including a flexible connecting member extending along each side of said trough sections from one end of the conveyer to the other and means for maintaining said connecting members under tension, to hold said trough sections in engagement with each other during reciprocation of the conveyer including fluid pressure cylinders and pistons having connection with each of said connecting members.

6. In a connecting device for a shaker conveyer trough line including a plurality of aligned shaker conveyer trough sections, abutting members adjacent said trough sections, a flexible member for holding said abutting members in engagement with each other during reciprocation of the trough, and a fluid pressure cylinder and piston for maintaining said flexible member under tension.

7. In a connecting device for a shaker conveyer trough line including a plurality of aligned shaker conveyer trough sections, abutting members on said trough sections, a flexible member having connection with an end trough section at one of its ends for continually holding said abutting members in engagement with each other, and a fluid pressure cylinder and piston mounted on an opposite end trough section and having connection with the opposite end of said flexible member, for maintaining said flexible member under tension during reciprocation of the conveyer.

8. In a connecting device for a shaker conveyer trough line including a plurality of aligned shaker conveyer trough sections, abutting members on said trough sections, a flexible connecting member having guiding engagement with said trough sections and being secured to one end trough section at one of its ends, a fluid pressure cylinder and piston mounted on said opposite end trough section, means for maintaining fluid under pressure in said cylinder, and a connection between the opposite end of said flexible member and piston, for maintaining said flexible member under tension and holding said abutting members in engagement with each other during reciprocation of the conveyer.

9. In a connecting device for a shaker conveyer trough line including a plurality of aligned shaker conveyer troughs, abutting members on adjacent ends of said troughs and a flexible member for continually holding said abutting members in engagement with each other during reciprocation of the conveyer, said flexible member including a plurality of spaced apart coupling rods, each of said coupling rods being guided in one of said trough sections, and flexible members connecting said coupling rods together at the joints between said trough sections.

10. In a connecting device for a shaker conveyer trough line including a plurality of aligned shaker conveyer troughs, abutting members on adjacent ends of said troughs and flexible members extending along opposite sides of the conveyer, for continually holding said abutting members in engagement with each other during reciprocation of the conveyer, each of said flexible members including a plurality of spaced apart coupling rods, supporting and guiding connections between the outer side walls of said trough sections and said coupling rods, and flexible members detachably connecting said coupling rods together, said flexible members extending across the joints between said trough sections, to permit disconnection of said connecting members and permit lengthening or shortening thereof, to permit troughs of said trough line to be inserted or taken out of said trough line.

ROY S. BIGELOW.